United States Patent [19]

Hayamatsu

[11] Patent Number: 5,191,515
[45] Date of Patent: Mar. 2, 1993

[54] STRUCTURE WHICH FASTENS AN LCD HOLDER AND A VOLUME CONTROL UNIT

[75] Inventor: Masatoshi Hayamatsu, Saitama, Japan

[73] Assignee: Clarion Co., Ltd., Tokyo, Japan

[21] Appl. No.: 719,712

[22] Filed: Jun. 26, 1991

[30] Foreign Application Priority Data

Jun. 27, 1990 [JP] Japan .................. 2-67271[U]

[51] Int. Cl.⁵ ........................................... H05K 7/02
[52] U.S. Cl. ................................ 361/417; 359/48; 359/83
[58] Field of Search .................... 361/417; 200/296; 206/305; 248/74.2, 27.1, 221.4; 359/48, 83; 455/347

[56] References Cited

FOREIGN PATENT DOCUMENTS 3314693 10/1984 Fed. Rep. of Germany ........ 359/83

*Primary Examiner*—Leo P. Picard
*Assistant Examiner*—D. Sparks

[57] ABSTRACT

An LCD (Liqid Crystal Display) holder involves a holding unit which holds an LCD panel for illumination and a volume control unit fastening unit which is engaged with a volume control unit to hold the volume control unit, the holding unit and the volume control unit fastening unit being formed integrally with each other. The use of the LCD holder permits the LCD panel and the volume control unit to be easily fastened to a base plate.

4 Claims, 6 Drawing Sheets

STRUCTURE WHICH FASTENS AN LCD HOLDER AND A VOLUME CONTROL UNIT

TECHNICAL FIELD

The present invention relates to structures which fasten an LCD holder and a volume control unit to a baseplate, and more particuarly to a structure which fastens the LCD holder and volume control unit one above the other.

BACKGROUND OF THE INVENTION

Generally, a display unit such as an LCD and a manipulating unit such as a volume control unit are disposed on the front of an escutcheon provided on front of an acoustic device. Members are provided for holding on the back of the escutcheon the LCD and volume control unit in position in the device and/or on a wiring board.

As an example of such an acoustic device, a car stereophonic device as shown in FIGS. 7 and 8 is known. In this car stereophonic device, an escutcheon 32 is attached to the front of a device casing 31. An LCD panel 33, a cassette tape insertion dust-proof door 34 and a knob 35 to adjust the sound volume, tone and balancing by turning the knob are attached to the escutcheon.

In this device, a conventional structure which fastens an LCD 36 and a volume control unit 37 is proposed as shown in FIGS. 9 and 10. A plate-like front chassis 38 is provided on the back of the escutcheon 32 in parallel relationship thereto. A pair of holes 39 is provided in an upper portion of the front chassis 38 to pass therethrough the corresponding volume control units 37. An opening (not shown) is provided in a lower portion of chassis 38 at a position corresponding to that of the LCD 36 to watch the LCD therethrough.

The device casing 31 includes an upper casing portion 31a and a lower casing portion 31b which includes a bottom plate and side plates. A volume baseplate 41 and a main baseplate 42 extend backwardly from the upper portion of the front chassis 38 and from the lower portion of the LCD panel 33 such that they are parallel to the upper casing portion 31a and to the lower casing bottom, respectively.

The volume control unit 37 includes an adjusted volume body 37a, a portion 37b fastened to the front chassis 38, and a manipulating unit 37c connected to the knob 35. The LCD 36 includes the LCD panel 33 as the front display, a holding unit 44, a light emitting element 43 for transparently illuminating the LCD panel 33 and a terminal 45 provided on the holding unit 44. The terminal 45 is provided in the form of an L so as to cover the lower end of the panel 33 and a forward part of the bottom 42.

The LCD 36 and volume control unit 37 are fastened such that the LCD panel 33 is disposed in a cutout 40 in the lower portion of the front chassis 38. The holding unit 44 is disposed behind the LCD panel 33. The LCD panel 36 is connected at its lower end to the main baseplate 42 through the terminal 45. The body 37a of the volume control unit 37 is attached to the underside of the volume baseplate 41. The fastened portion 37b of the volume control unit 37 extends through the hole 39 in the front chassis 38 while the manipulating unit 37c protrudes forwardly through the escutcheon 32. By tightening a nut 46 against the fastened portion 37b, the volume control unit 37 is fastened to the front chassis 38.

However, the structure which fastens the LCD holder and volume control unit requires many volume control unit fastening members such as the front chassis 38 and volume baseplate 41 and hence the steps of fastening those members. In order to securely fasten the volume control unit 37 at a position spaced from the main baseplate 42, a troublesome process for tightening the nut 46 against the plate-like front chassis 38 is required. Thus, generally, in the prior art, the number of parts assembled and the number of steps of assembling the parts are large and complicated. Therefore, there is a correspondingly increasing probability that the fact will be a cause of failures and that the manufacturing cost will increase.

SUMMARY OF THE INVENTION

The above problems with the prior art are solved by the present invention which provides a structure which fastens an LCD holder and a volume control unit of a device with an LCD, comprising:

a baseplate provided within the device; and a volume control unit having a terminal;

the LCD holder including a holding unit which accommodates a light emitting element therein for illuminating a LCD panel and covering the back of the LCD panel, and a volume control unit fastening unit engaged with the volume control unit for fastening same, the holding unit and the volume control unit fastening unit being formed as a unit one above the other;

the LCD holder being fastened at the holding unit to the baseplate;

the volume control unit being fastened to the volume control unit fastening unit of the LCD holder and, through the terminal, to the baseplate.

BRIEF DESCRIPTION OF THE DRAWINGS

The present invention will be better appreciated by consideration of the following detailed description, when read in light of the accompanying drawings in which.

DETAILED DESCRIPTION OF THE PREFERRED EMBODIMENT

Figure 1:
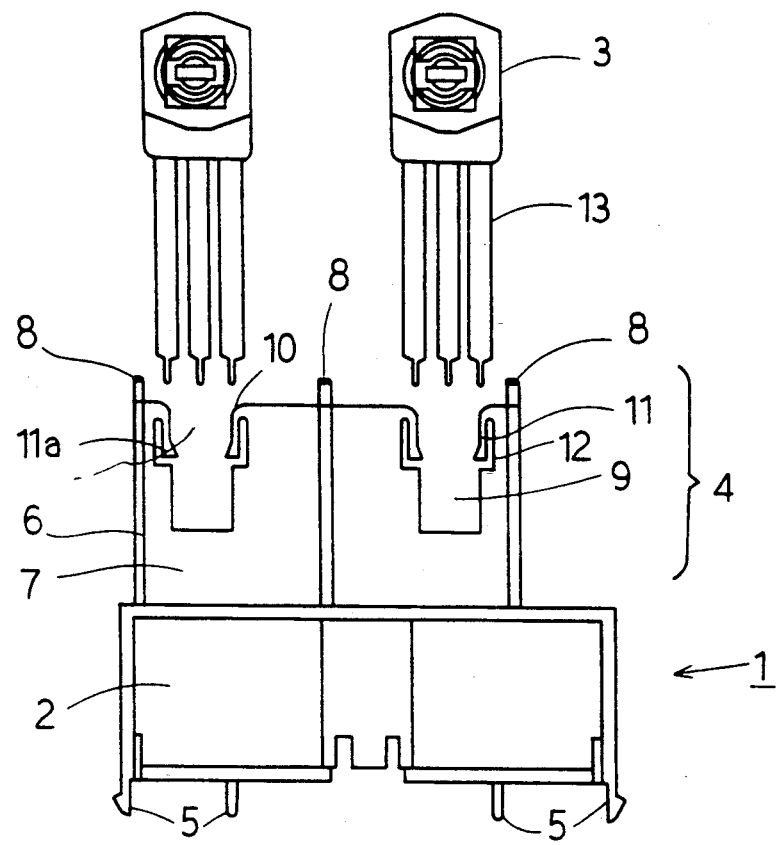
FIG. 1 is an exploded front view of the essential portion of an embodiment of a structure which fastens the LCD and volume control unit according to the present invention.
Figure 7:
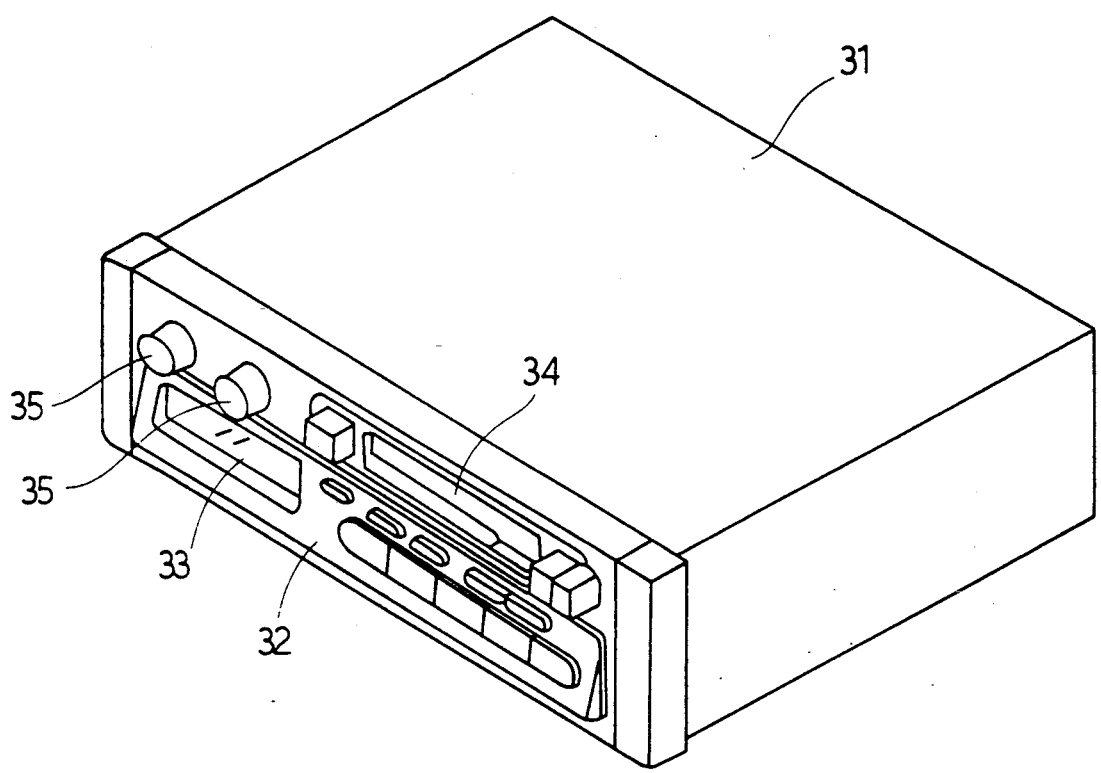
FIG. 7 is a perspective view of an illustrative acoustic device in which the conventional fastening structure is used.
Figure 8:
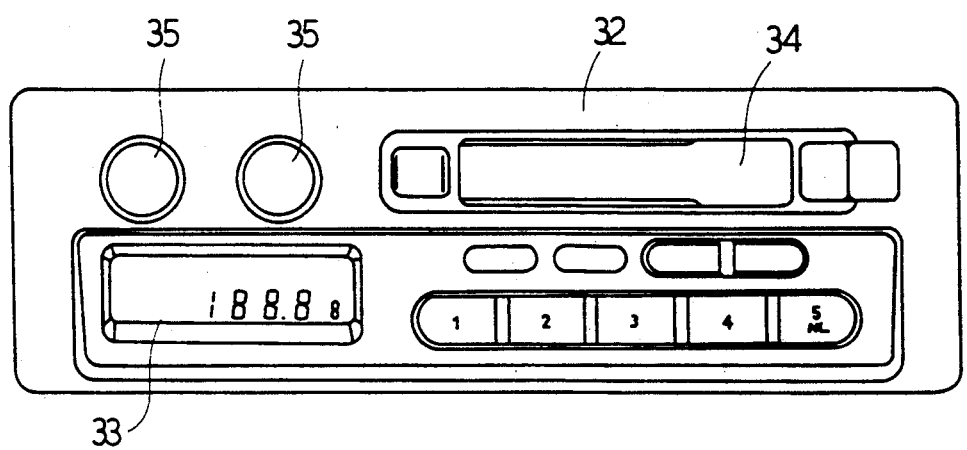
FIG. 8 is a front view of the FIG. 7 acoustic device.
Figure 9:
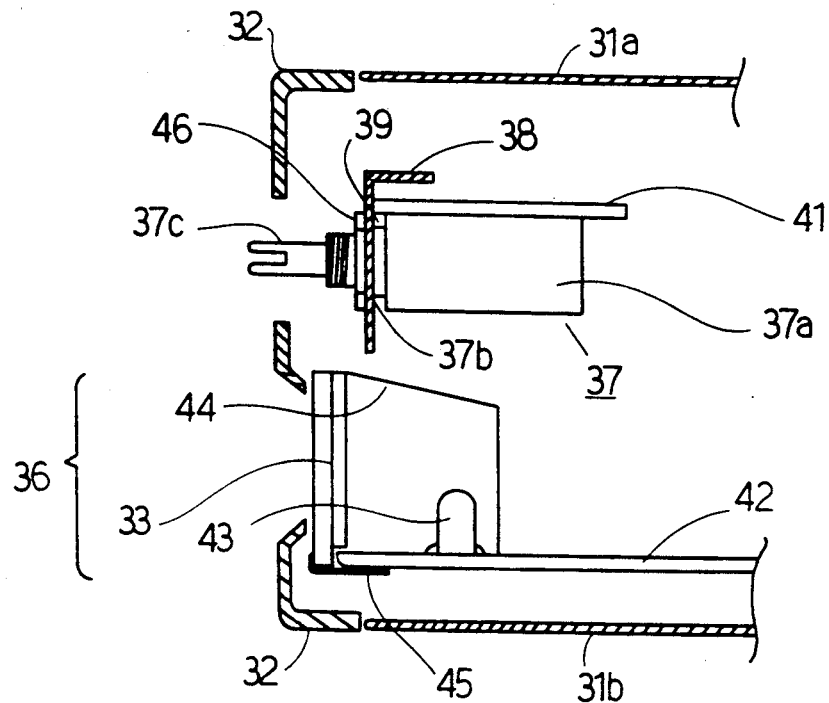
FIG. 9 is a perspective view of the essential portion of a conventional structure which fastens an LCD and a volume control unit.
Figure 10:
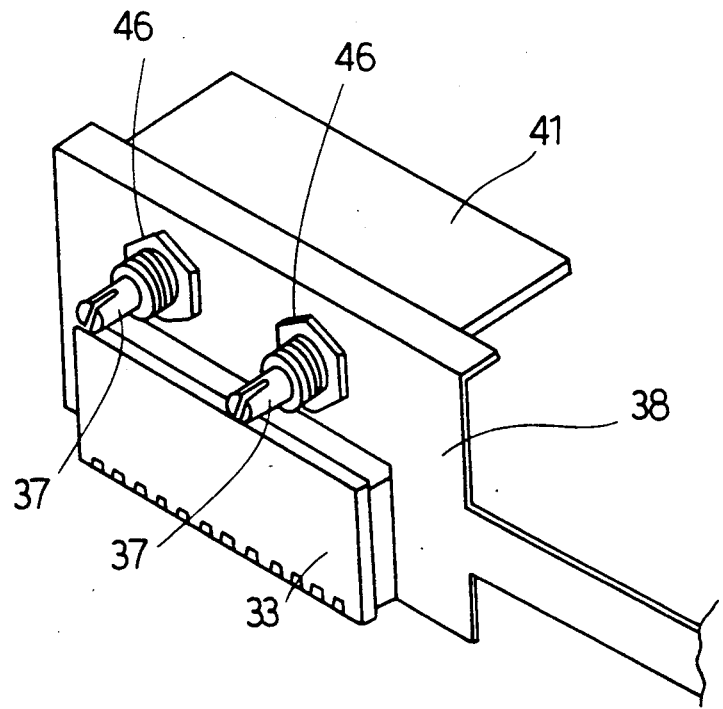
FIG. 10 is a cross-sectional side view of the essential portion of the conventional fastening structure.

FIG. 1 is an exploded front view of an LCD holder 1 of an embodiment of an acoustic device having an appearance similar to that of the FIGS. 7 and 8 acoustic device and to which embodiment the fastening structure of the present invention is applied. The LCD holder 1 includes a holding unit 2 and a volume control unit fastening unit 4 provided above the holding unit 2 with the holding unit 2 and the volume control unit fastening unit 4 being resin molded integrally with each other. The holding unit 2 has four baseplate engaging claws 5 extruding downward therefrom. The volume control unit fastening unit 4 includes a volume control unit attaching wall 7 and three ribs 6 which support both the sides and central portion of the wall 7. The ribs 6 and volume control unit attaching wall 7 are formed upstanding on the top of the holding unit 2. Three pillar-like fastening protrusions 8 are provided at the corresponding positions where the tops of the ribs 6 and the top of the wall 7 intersect with each other.

A volume control unit holding cutout 9 open upward is provided in each of the volume control unit attaching walls 7 partitioned by the ribs 6. The cutouts 9 each have an enlarged upper end 10. The cutouts each have a pair of flexible side stops 11 one on each inner side of the corresponding cutout 9 and defined by the adjacent smaller elongated cutout 12 such that stop 11 extends downward. The stops 11 each take the form of a substantial L a lower end of which constitutes a claw 11a protruding laterally inward so as to slightly narrow the cutout 9.

Figure 2:
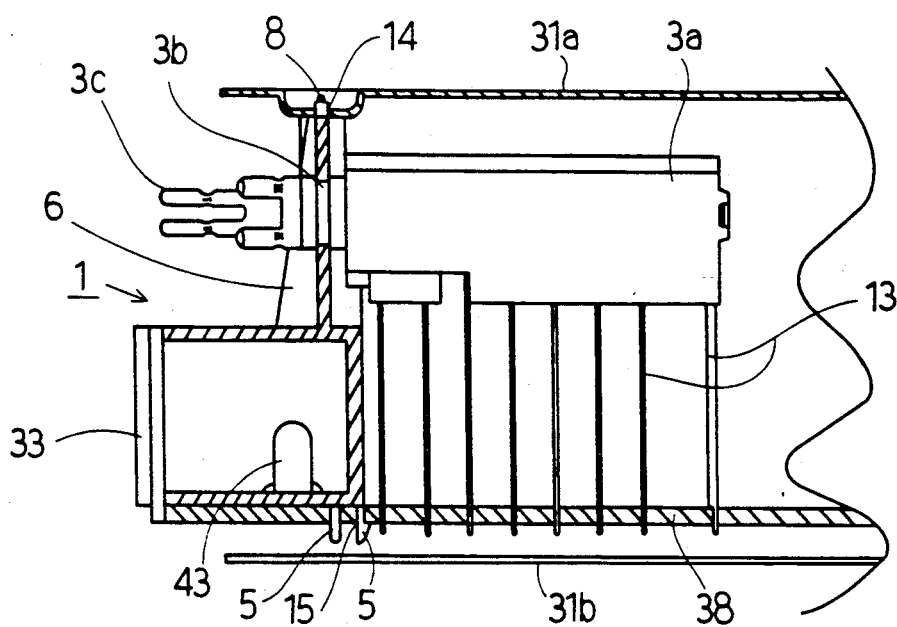
FIG. 2 is a cross-sectional side view of the essential portion of the embodiment.
Figure 3:
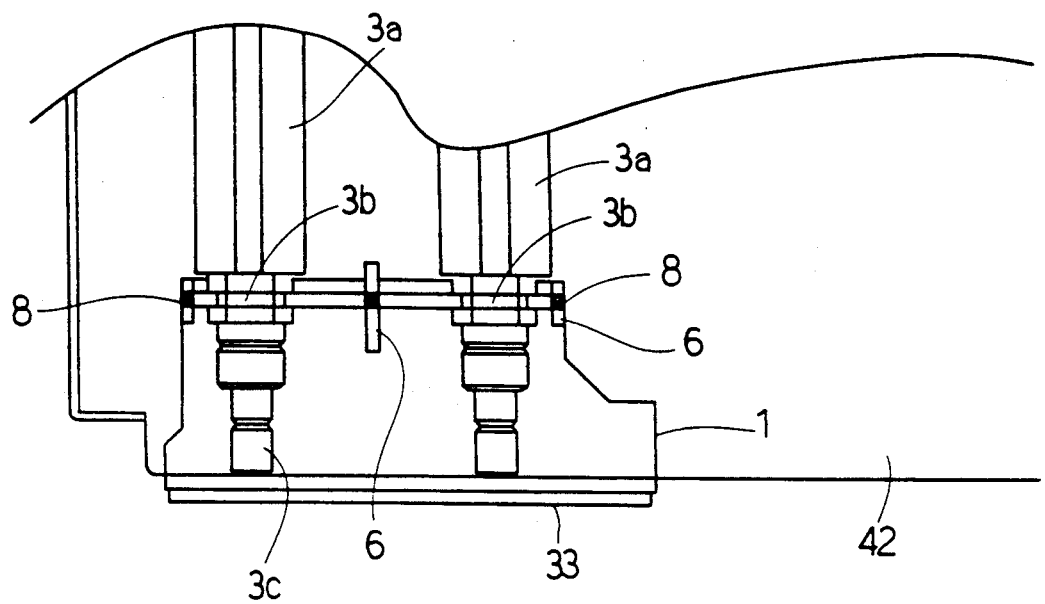
FIG. 3 is a plan view of the embodiment where the LCD and volume control unit are fastened.
Figure 4:
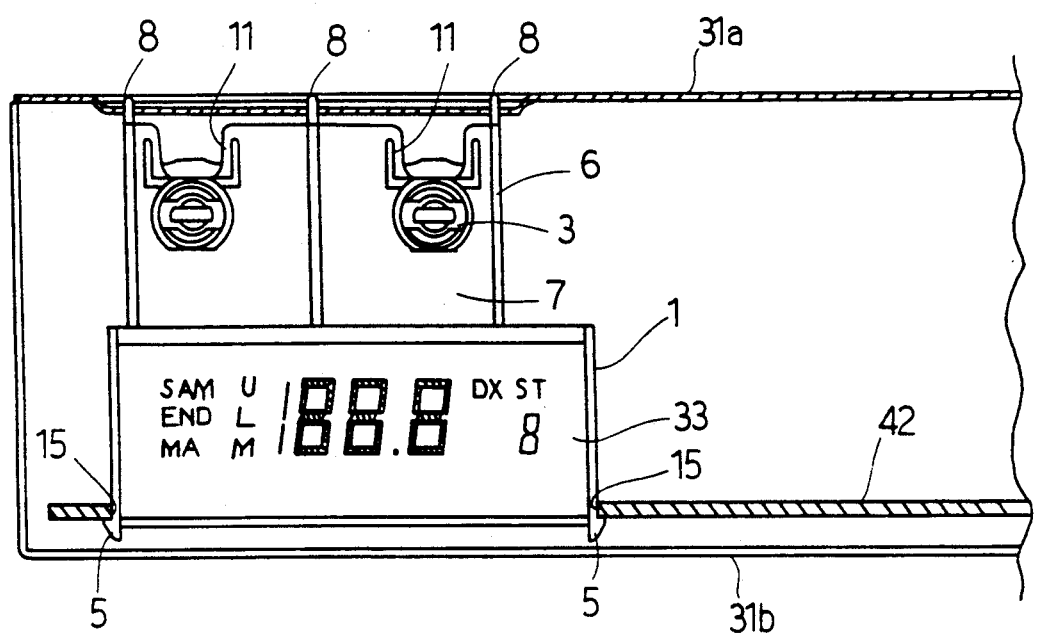
FIG. 4 is a front view of the embodiment where the LCD and volume control unit are fastened.

FIGS. 2-4 show the structure which fastens the LCD holder 1 and volume control unit 3. As shown in FIG. 2, the volume 3 includes an adjacent volume body 3a, a manipulating unit 3c and a fastening groove 3b which fastens the volume control unit 3 and is provided between the body 3a and the manipulating unit 3c. An array of long rigid terminal legs 13 are formed extending downward from the body 3a. The length of the terminal legs 13 is such that they reach the main baseplate 42 when the volume control unit 3 is attached in the volume control unit holding cutouts 9. The terminal legs 13 have rigidity sufficient to support the body 3a.

The upper casing 31a has engaging holes 14 which the upper fastening protrusions 8 engage. The main baseplate 42 has therein engaging holes 15 which the corresponding baseplate engaging claws 5 of the holding unit 2 engage and fastening holes 16 which the corresponding terminal legs 13 of the volume control unit 3 engage.

Figure 5:
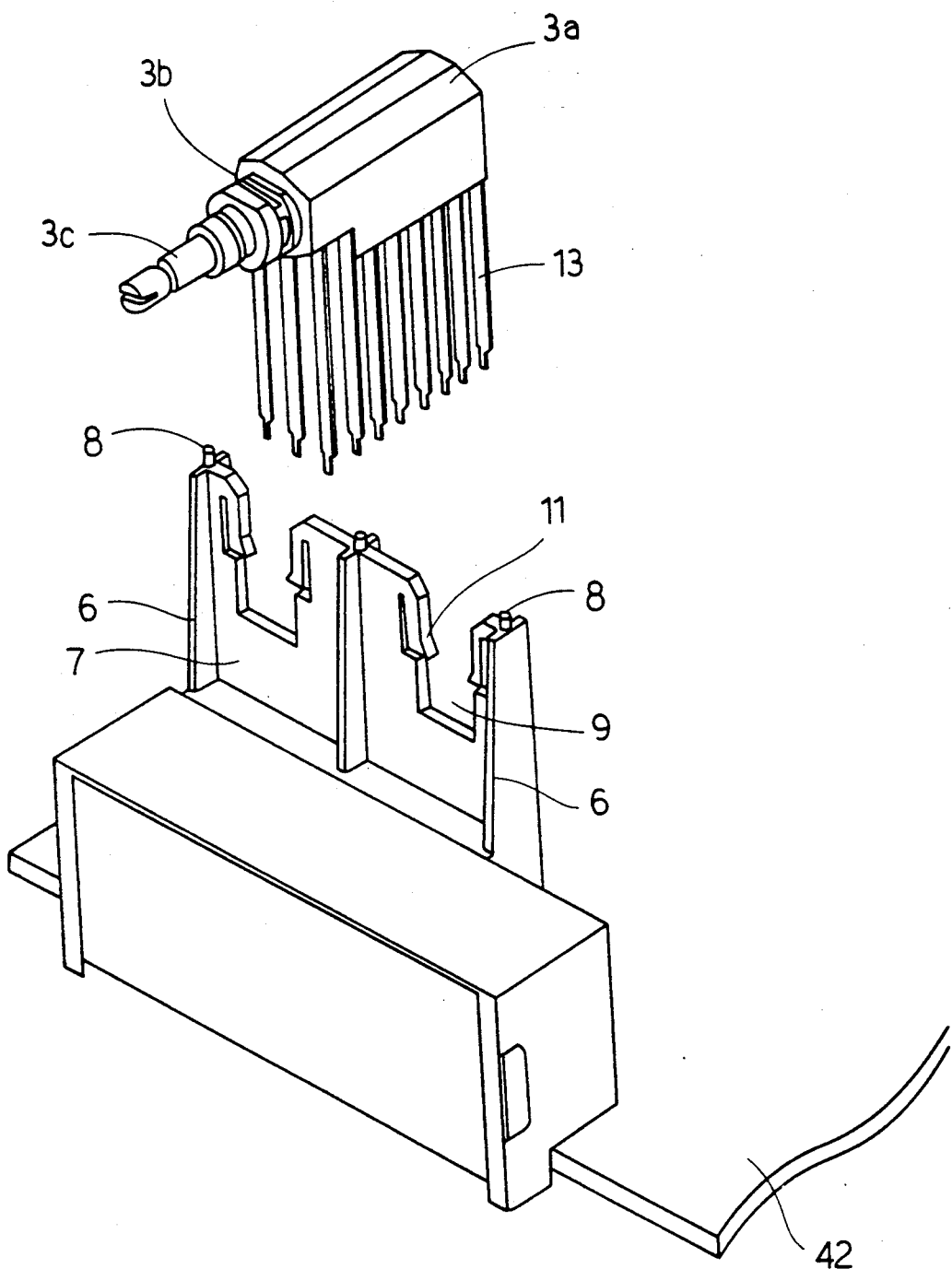
FIG. 5 is a perspective exploded view of the embodiment.
Figure 6:
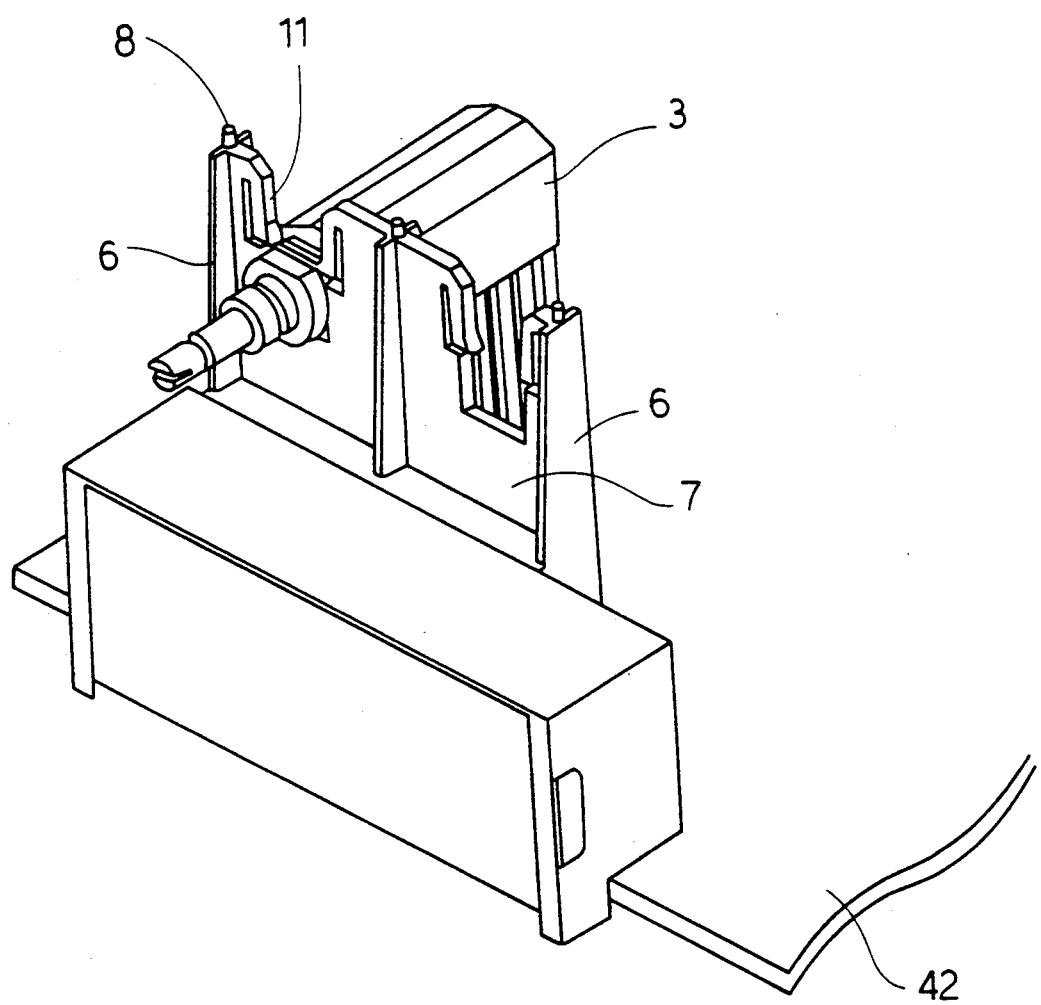
FIG. 6 is a perspective view of the embodiment where the LCD and volume control unit are fastened.

FIG. 5 is a perspective view of the exploded volume control unit 3 and LCD holder 1 before engagement. FIG. 6 is a perspective view of the volume control unit 3 and LCD holder 1 after engagement.

In operation, first, each volume control unit 3 is inserted from above along its groove 3b into the corresponding volume holding cutout 9. During this insertion, the volume control unit 3 is temporality stopped by the associated pair of flexible stops 11. Thereafter, the stops 11 are retracted laterally through the associated L-shaped small slots 12, so that the volume control unit 3 is able to pass by the stops. The flexible stops 1 which have temporarily been flexibly retracted restore themselves after passage of the volume control unit 31 to push the volume control unit groove 3b from above to thereby eliminate possible vertical backlash of the volume control unit. The volume control unit 3 is held at its groove on both right and left sides by the volume holding cutout 9. Thus, the volume control unit is securely fastened to the LCD holder 1.

Simultaneously with the fastening of the volume control unit 3 to the LCD holder 1, the other members are also fastened as shown in FIG. 2. The upper fastening protrusions 8 formed on the top of the LCD holder 1 are engaged in the corresponding engaging holes 14 in the upper casing portion 31a while the bottom engaging claws 5 formed at the four positions on the underside of the holder unit 2 are engaged in the corresponding engaging holes 15 in the baseplate 42. The terminal legs 13 are fastened at their free ends in the corresponding fastening holes 16 in the main baseplate 42. Therefore, the LCD holder 1 is securely held and fastened between the upper casing 31a and the baseplate 42. Since the adjusted volume body 3a is directly connected to and held by the main baseplate 42 through the terminal legs 13, the load comprising the volume control unit 3 is not exerted on the LCD holder 1.

As described above, according to the present embodiment, the LCD holder 1 comprising a resin molding is used for fastening the LCD and volume control unit 3 to the baseplate 42, so that the front chassis, the volume baseplate and the nuts are reduced in number. Fastening the volume control unit 3 requires only insertion of the volume control unit 3 into the holding cutout, so that tightening the nuts 46 is unnecessary to thereby simplify the entire manufacturing process.

Generally, a resin molding such as the LCD holder of the present embodiment is low in strength compared to a LCD holder made of plate-like metal having the same thickness as the LCD holder molding. In the present embodiment, however, the LCD holder 1 as the resin molding is fixedly held vertically between the associated members such that the load exerted on the LCD holder 1 by other members is reduced to thereby compensate for any insufficient strength of the holder.

The present invention is not limited to the above embodiment. The specified shapes of the members mentioned above, the positions where those members are attached, and the methos of attaching those members may be changed when required.

The upper and lower members between which the LCD holder is held are not limited to the upper casing and the baseplate. For example, if the baseplate is attached up within the device casing, the substrate and the lower casing may hold the LCD holder without any problems.

The structure which fastens the LCD and the volume control unit according to the present invention is not limited to those of the audio devices mounted on cars. For example, the present invention is applicable to various devices such as indoors installed acoustic devices and video devices and various devices where volume is adjusted by rotating the volume control unit.

I claim:

1. A structure which fastens an LCD holder and a volume control unit in a device with an LCD, comprising:
   a baseplate provided within the device; and
   a volume control unit having a terminal;
   the LCD holder including a holding unit which accommodates a light emitting element therein for illuminating an LCD panel and which covers the back of the LCD panel, and a volume control unit fastening unit engaged with the volume control unit for fastening the volume control unit to the LCD holder, the holding unit and the volume control unit fastening unit being formed as a unit one above the other;

the LCD holder being fastened at the holding unit to the baseplate; and the volume control unit being fastened to the volume control unit fastening unit of the LCD holder and, through the terminal, to the baseplate.

2. A structure according to claim 1, wherein the LCD holder is engaged with a casing of the device at an end of the volume control unit fastening unit.

3. A structure according to claim 1, wherein the volume control unit fastening unit is flexibly engaged with the volume control unit.

4. A structure according to claim 1, wherein the entire LCD holder is made of a resin.

* * * * *